United States Patent [19]

Hattori et al.

[11] Patent Number: 5,178,981
[45] Date of Patent: Jan. 12, 1993

[54] PHOTOCONDUCTOR FOR ELECTROPHOTOGRAPHY WITH A CHARGE GENERATING SUBSTANCE COMPRISING A POLYCYCLIC AND AZO COMPOUND

[75] Inventors: Yoshimasa Hattori; Yoshinobu Sugata; Masami Kuroda; Noboru Furusho, all of Kawasaki, Japan

[73] Assignee: Fuji Electric Co., Ltd., Kawasaki, Japan

[21] Appl. No.: 661,249

[22] Filed: Feb. 27, 1991

[30] Foreign Application Priority Data

Mar. 8, 1990 [JP] Japan .................................. 2-56927

[51] Int. Cl.5 .............................................. G03G 5/06
[52] U.S. Cl. ...................................... 430/58; 430/59; 430/77; 430/78
[58] Field of Search ..................... 430/58, 59, 77, 78, 430/76

[56] References Cited

U.S. PATENT DOCUMENTS

| | | | |
|---|---|---|---|
| 3,189,447 | 6/1965 | Neugebauer et al. | 96/1 |
| 3,484,237 | 12/1969 | Shattuck et al. | 96/1.5 |
| 3,816,118 | 6/1974 | Byrne | 96/1.5 |
| 4,150,987 | 4/1979 | Anderson et al. | 96/1.5 R |
| 4,278,747 | 7/1981 | Murayama et al. | 430/82 |
| 4,353,971 | 10/1982 | Chang et al. | 430/58 |
| 4,367,273 | 1/1983 | Murayama et al. | 430/56 |
| 4,385,106 | 5/1983 | Sakai | 420/59 |
| 4,415,640 | 11/1983 | Goto et al. | 430/59 |
| 4,448,868 | 5/1984 | Suzuki et al. | 430/58 |
| 4,565,761 | 1/1986 | Katagiri et al. | 430/83 |
| 4,568,623 | 2/1986 | Makino et al. | 430/58 |

(List continued on next page.)

FOREIGN PATENT DOCUMENTS

| | | |
|---|---|---|
| 0034942 | 9/1981 | European Pat. Off. |
| 0131140 | 1/1985 | European Pat. Off. |
| 0270685 | 6/1988 | European Pat. Off. |
| 1058836 | 6/1959 | Fed. Rep. of Germany |
| 2944949 | 6/1980 | Fed. Rep. of Germany |
| 3022545 | 1/1981 | Fed. Rep. of Germany |
| 3138292 | 5/1982 | Fed. Rep. of Germany |
| 3203621 | 9/1982 | Fed. Rep. of Germany |
| 3208337 | 9/1982 | Fed. Rep. of Germany |

(List continued on next page.)

Primary Examiner—Marion E. McCamish
Assistant Examiner—S. Rosasco
Attorney, Agent, or Firm—Spencer, Frank & Schneider

[57] ABSTRACT

A photoconductor for electrophotography includes an electroconductive substrate; and a photosensitive layer formed on the substrate. The photosensitive layer includes a charge generating substance consisting essentially of at least one polycyclic compound represent by general formula (I) and at least one azo compound represented by general formula (II).

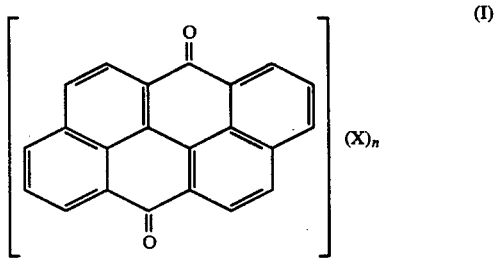

wherein X is selected from the group consisting of a hydrogen atom, a halogen atom and a cyano group and n is an integer of 0 to 4;

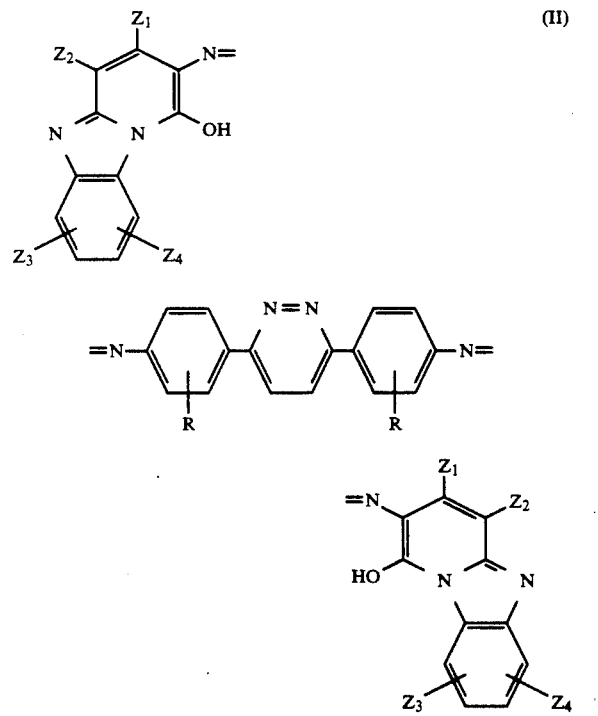

wherein R is selected from the group consisting of a hydrogen atom, a halogen atom and a substituted or unsubstituted alkyl group and alkoxy group, $Z_1$ is selected from the group consisting of a substituted or unsubstituted alkyl group, aryl group and aromatic heterocyclic group, $Z_2$ is selected from the group consisting of a hydrogen atom, a cyano group, a carbomoyl group, a carboxyl group, an ester group and an acyl group, each of $Z_3$ and $Z_4$ is selected from the group consisting of a hydrogen atom, a halogen atom, a nitro group and a substituted or unsubstituted alkyl group and alkoxy group.

8 Claims, 1 Drawing Sheet

U.S. PATENT DOCUMENTS

| | | | |
|---|---|---|---|
| 4,606,986 | 8/1986 | Yanus et al. | 430/59 |
| 4,624,904 | 11/1986 | Kazmaier et al. | 430/59 |
| 4,629,670 | 12/1986 | Katagiri et al. | 430/58 |
| 4,629,672 | 12/1986 | Makino et al. | 430/76 |
| 4,666,809 | 5/1987 | Matsumoto et al. | 430/76 |
| 4,673,630 | 6/1987 | Katagiri et al. | 430/72 |
| 4,677,045 | 6/1987 | Champ et al. | 430/76 |
| 4,702,983 | 10/1987 | Haino et al. | 430/75 |
| 4,731,315 | 3/1988 | Horie et al. | 430/77 |
| 4,783,387 | 11/1988 | Ueda | 430/76 |
| 4,808,503 | 2/1989 | Yamada et al. | 430/75 |
| 4,839,252 | 6/1989 | Murata et al. | 430/59 |
| 4,861,691 | 8/1989 | Kuroda et al. | 430/59 |
| 4,861,692 | 8/1989 | Kuroda et al. | 430/59 |
| 4,865,934 | 9/1989 | Ueda et al. | 430/59 |
| 4,871,636 | 10/1989 | Hattori et al. | 430/77 |
| 4,877,703 | 10/1989 | Kuroda et al. | 430/76 |
| 4,882,255 | 11/1989 | Hattori et al. | 430/73 |
| 4,898,799 | 2/1990 | Fujimaki et al. | 430/59 |
| 4,910,110 | 3/1990 | Kuroda et al. | 430/59 |
| 4,929,525 | 5/1990 | Kuroda et al. | 430/75 |
| 4,935,323 | 6/1990 | Hattori et al. | 430/58 |
| 4,945,021 | 7/1990 | Takata et al. | 430/76 |
| 4,948,689 | 8/1990 | Kuroda et al. | 430/59 |
| 4,950,572 | 8/1990 | Kuroda et al. | 430/59 |
| 4,954,405 | 9/1990 | Sugata et al. | 430/58 |
| 4,956,250 | 9/1990 | Kuroda et al. | 430/58 |
| 4,956,255 | 9/1990 | Ueda | 430/59 |
| 4,956,277 | 9/1990 | Kuroda et al. | 430/58 |
| 4,957,837 | 9/1990 | Kuroda et al. | 430/59 |
| 4,971,876 | 11/1990 | Kuroda et al. | 430/75 |
| 4,985,325 | 1/1991 | Kuroda et al. | 430/59 |
| 4,988,594 | 1/1991 | Hattori et al. | 430/59 |

FOREIGN PATENT DOCUMENTS

| | | |
|---|---|---|
| 3303830 | 8/1983 | Fed. Rep. of Germany . |
| 3320674 | 12/1983 | Fed. Rep. of Germany . |
| 3602987 | 10/1986 | Fed. Rep. of Germany . |
| 3643341 | 6/1987 | Fed. Rep. of Germany . |
| 3841207 | 6/1989 | Fed. Rep. of Germany . |
| 3842253 | 6/1989 | Fed. Rep. of Germany . |
| 10785 | 5/1972 | Japan . |
| 37543 | 12/1972 | Japan . |
| 150128 | 11/1979 | Japan . |
| 42380 | 10/1980 | Japan . |
| 116039 | 9/1981 | Japan . |
| 101844 | 6/1982 | Japan . |
| 176055 | 10/1982 | Japan . |
| 198043 | 11/1983 | Japan . |
| 2023 | 1/1984 | Japan . |
| 133553 | 7/1984 | Japan . |
| 182456 | 10/1984 | Japan . |
| 182457 | 10/1984 | Japan . |
| 204840 | 11/1984 | Japan . |
| 93443 | 5/1985 | Japan . |
| 45664 | 10/1985 | Japan . |
| 60-052 | 12/1985 | Japan . |
| 5941 | 2/1986 | Japan . |
| 29496 | 7/1986 | Japan . |
| 262052 | 11/1987 | Japan . |
| 264055 | 11/1987 | Japan . |
| 131146 | 6/1988 | Japan . |
| 158560 | 7/1988 | Japan . |
| 189870 | 8/1988 | Japan . |
| 189871 | 8/1988 | Japan . |
| 208849 | 8/1988 | Japan . |
| 244043 | 10/1988 | Japan . |
| 567 | 1/1989 | Japan . |
| 49050 | 2/1989 | Japan . |
| 100558 | 4/1989 | Japan . |
| 118846 | 5/1989 | Japan . |
| 185637 | 7/1989 | Japan . |
| 234856 | 9/1989 | Japan . |
| 241561 | 9/1989 | Japan . |
| 79855 | 3/1990 | Japan . |

PHOTOCONDUCTOR FOR ELECTROPHOTOGRAPHY WITH A CHARGE GENERATING SUBSTANCE COMPRISING A POLYCYCLIC AND AZO COMPOUND

BACKGROUND OF THE INVENTION

1. Field of the Invention

The present invention relates to photoconductors for electrophotography, and particularly to a photoconductor for electrophotography which contains a novel charge generating substance in the photosensitive layer thereof formed on an electroconductive substrate.

2. Description of the Prior Art

Photosensitive materials which have heretofore been used in photoconductors for electrophotography include inorganic photoconductive substances such as selenium and selenium alloys, dispersions of inorganic photoconductive substances such as zinc oxide and cadmium sulfide in resin binders, organic polymeric photoconductive substances such as poly-N-vinylcarbazole and polyvinylanthracene, organic photoconductive substances such as phthalocyanine compounds and bisazo compounds, dispersions of such organic photoconductive substances in resin binder.

Photoconductors are required to have a function of maintaining a surface electric charge in the dark, a function of generating an electric charge upon receiving light, and a function of transporting an electric charge upon receiving light. They are classified into two types of photoconductors, namely so-called monolayer type photoconductors, and so-called laminate type photoconductors. The former comprises a single layer having all of the above-mentioned three functions, and the latter comprises functionally distinguishable laminated layers, one of which contributes mainly to the generation of electric charge, and another of which contributes to the retention of surface electric charge in the dark and the electric charge transportation upon receiving light.

In an electrophotographic method using a photoconductor of the kind as mentioned above, for example, the Carlson's system is applied to image formation. The image formation according to this system comprises steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralization of the residual charge with light (erasion), and so on to be ready for reuse.

Photoconductors for electrophotography in which use is made of organic materials have recently been put into practical use by virtue of the advantageous features of flexibility, thermal stability, and/or a film forming capacity. Many photoconductors having a photoconductive organic dye or pigment with an excellent charge generation ability have been proposed. They include a photoconductor comprising poly-N-vinylcarbazole and 2,4,7-nitrofluorene-9-one (disclosed in U.S. Pat. No. 3,484,237), on organic pigment as a main component (disclosed in Japanese Patent Application Laying-Open No. 37,543/1972), a eutectic complex composed of an ordanic dye and a resin (disclosed in Japanese Patent Application Laying-Open No. 10,785/1972) and so on. A lot of novel hydrazone compounds and perylene compounds are also used.

Although organic materials have many advantageous features mentioned above with which inorganic materials are not endowed, however, the fact is that there have been obtained no organic materials fully satisfying all the characteristics required of a material to be used in photoconductors for electrophotography at the present. Particular problems involved in organic materials have been concerned with photosensitivity, characteristics in continuous repeated use and spectral characteristics especially blue and red reproduction.

SUMMARY OF THE INVENTION

An object of the present invention, which has been made in view of the foregoing, is to provide a photoconductor for electrophotography for use in copying apparatuses and printers which photoconductor includes a novel organic material not used to date as a charge generating substance in the photosensitive layer, and has a high photosensitivity and excellent characteristics in repeated use.

Another object of the present invention is to provide a photoconductor for electrophotography having a good blue and red reproduction.

According to the present invention, there is provided a photoconductor for electrophotography comprises:

an electroconductive substrate; and a photosensitive layer formed on said substrate and including at least one polycyclic compound represent by the following general formula (I) as a charge generating substance in combination with at least one azo compound represented by the following general formula (II):

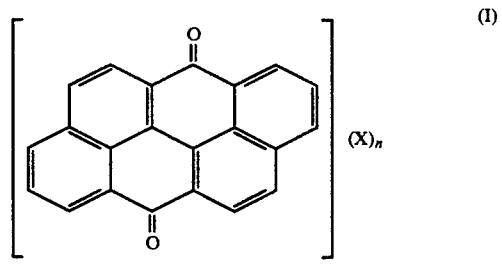

wherein X is selected from the group consisting of a hydrogen atom, a halogen atom and a cyano group and n is an integer of 0 to 4;

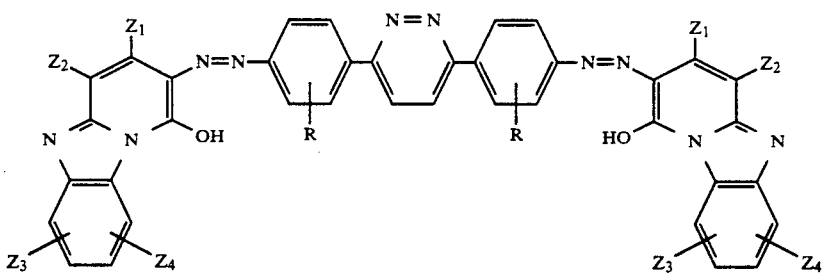

wherein R is selected from the group consisting of a hydrogen atom, a halogen atom and a substituted or unsubstituted alkyl group and alkoxy group, $Z_1$ is selected from the group consisting of a substituted or unsubstituted alkyl group, aryl group and aromatic heterocyclic group, $Z_2$ is selected from the group consisting of a hydrogen atom, a cyano group, a carbamoyl group, a carboxyl group, an ester group and an acyl group, each of $Z_3$ and $Z_4$ is selected from the group consisting of a hydrogen atom, a halogen atom, a nitro group and a substituted or unsubstituted alkyl group and alkoxy group.

Here, the photosensitive layer may comprise a layer including dispersion of the at least one polycyclic compound represented by the general formula (I) and the at least one azo compound represented by the general formula (II) as the charge generating substance and a charge transporting substance.

The photosensitive layer may comprise a laminate of a charge transporting layer mainly composed of a charge transporting substance and a charge generating layer including the at least one polycyclic compound represented by the general formula (I) and the at lease one azo compound represented by the general formula (II).

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
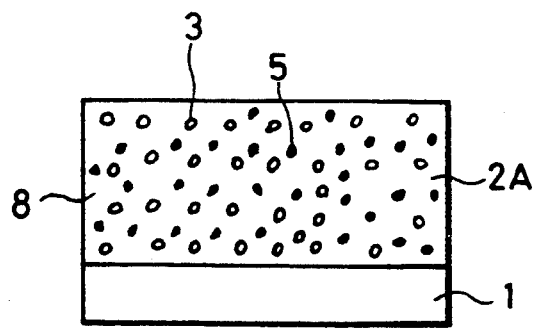
FIGS. 1 to 3 are schematic cross-sectional views of photoconductors according to the present invention.
Figure 2:
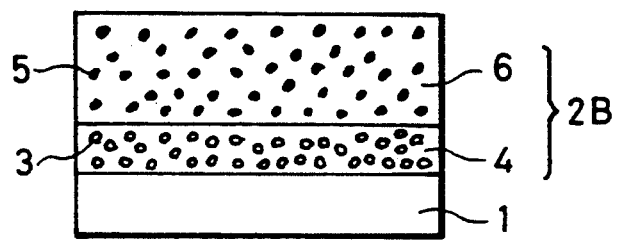
Figure 3:
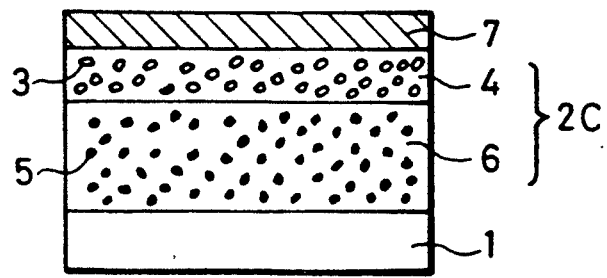

The photoconductor of the present invention, which contains the specific polycyclic quinone compound and azo compound as a charge generating substance in the photosensitive layer thereof, may have any one of the structures as shown in FIGS. 1, 2 and 3 according to the manner of application thereto of the above-mentioned compounds. The specific polycyclic quinone compounds and azo compounds to be used in the present invention are explained later.

FIGS. 1, 2 and 3 are schematic cross-sectional views of different embodiments of the photoconductor of the present invention, respectively.

FIG. 1 shows a schematic cross-sectional view of a monolayer type photoconductor. A photosensitive layer 2A is provided on an electroconductive substrate 1. The photosensitive layer 2A comprises the above-mentioned polycyclic compound and azo compound as a charge generating substance 3, and a charge transporting substance 5 both of which substances are dispersed in a resin binder matrix 8 so that the photosensitive layer 2A functions as a photoconductor.

FIG. 2 shows a laminate type photoconductor. A laminated photosensitive layer 2B is provided on an electroconductive substrate 1, a lower layer of the laminate is a charge generating layer 4 including the above-mentioned polycyclic quinone compound and azo compound as a charge generating substance 3 and an upper one is a charge transporting layer 6 containing a charge transporting substance 5 as a main component, so that the photosensitive layer 2B functions as a photoconductor. A covering layer (not shown) may be provided on the charge transporting layer 6. This photoconductor is usually used according to the negative charge mode.

FIG. 3 shows another laminate type photoconductor having a layer structure in reverse to that of FIG. 2. A laminated photosensitive layer 2C is provided on an electroconductive substrate 1, a lower layer of the laminate is a charge transporting layer 6 and an upper one is a charge generating layer 4 including the above-mentioned polycyclic quinone compound and azo compound as a charge generating substance 3. The photosensitive layer also functions as a photoconductor. This photoconductor is usually used according to the positive charge mode. In this case, a covering layer 7 may generally be further provided as shown in FIG. 3 to protect the charge generating layer 4.

Thus, two kinds of layer structure are provided for laminate type photoconductors. The reason for this is that, even if any photoconductor with the layer structure as shown in FIG. 2 is to be used in the positive charge mode, no charge transporting substances adaptable to the positive charge mode have been found yet. Accordingly, when any laminate type photoconductor is to be used in the positive charge mode, the photoconductor is required of a layer structure as shown in FIG. 3 for the present.

A photoconductor as shown in FIG. 1 can be produced by dispersing a charge generating substance and a charge transporting substance in a solution of a resin binder and applying the resulting dispersion on an electroconductive substrate and then drying the resulting coating film.

A photoconductor as shown in FIG. 2 can be prepared by applying and drying a dispersion of a particulate charge generating substance in a solvent and/or a resin binder on an electroconductive substrate, followed by applying a solution of a charge transporting substance and a resin binder on the resulting layer and drying.

A photoconductor as shown in FIG. 3 can be prepared by applying and drying a solution of a charge transporting substance and a resin binder onto an electroconductive substrate, and coating and drying dispersion of a particulate charge generating substance in a solvent and/or a resin binder onto the resulting coating layer, followed by formation of a covering layer.

The electroconductive substrate 1 serves as an electrode of the photoconductor and as a support for a layer or layers formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of a charge generating substance 3 in a resin binder, and this layer generates an electric charge upon receiving light. It is desirable that the charge generating layer 4 be high in sensitivity for the light of wide wavelength from blue to red, and further be high not only in charge generating efficiency but also in capability of injecting the generated electric charge into the charge transporting layer 6 and any covering layer 7, which capability is desirably as little dependent upon the electric field as possible and high even in low intensity electric fields. It also is possible to form a charge generating layer using a charge generating substance as a main component in mixture with a charge transporting substance and so on. Resin binders usable in the charge generating layer include polycarbonates, polyesters, polyvinyl chloride, polyamides, polyurethanes, silicone resins and homopolymers and copolymers of methacrylate esters, which may be used either alone or in appropriate combination.

In the present invention, the specific polycyclic quinone compound and azo compound are used for the charge generating substance to satisfy the above-mentioned requirements.

The charge transporting layer 6, which is formed by application of a solution or dispersion of a hydrazone compound, a pyrazoline compound, a styryl compound, a triphenyl-amine compound, an oxazole compound or an oxadiazole compound as an organic charge transporting substance in a resin binder, exhibits a function of serving as an insulating layer in the dark to retain an electric charge of the photoconductor as well as a function transporting an electric charge injected from the charge generating layer upon receiving light. Resin binders usable in the charge transporting layer include polycarbonates, polyesters, polyamides, polyurethanes, epoxy resins, silicone resins and homopolymers and copolymers of methacrylate esters and so on, which may be used either alone or in appropriate combination.

The covering layer 7 has a function of receiving and retaining an electric charge generated by corona discharge in the dark and a capability of transmitting light to which the charge generating layer should respond. It is necessary that the covering layer 7 transmits light upon exposure of the photoconductor and allows the light to reach the charge generating layer, and then undergoes the injection of an electric charge generated in the charge generating layer to neutralize and erases a surface electric charge.

Materials usable in the covering layer include organic insulating film-forming materials such as polyesters and polyamides. Such organic materials may also be used in mixture with an inorganic material such as glass resin or $SiO_2$, or an electric resistance-lowering material such as a metal or a metallic oxide. Materials usable in the covering layer are not limited to organic insulating film-forming materials, and further include inorganic materials such as $SiO_2$, metals, and metallic oxides, which may be formed by an appropriate method such as vacuum evaporation and deposition, or sputtering. From the viewpoint of the aforementioned description, it is desirable that the material to be used in the covering layer be as transparent as possible in the wavelength range wherein the charge generating substance attains maximum light absorption.

Although the thickness of the covering layer depends on the material or composition thereof, it can be arbitrarily set in so far as it does not produce any adverse effects including an increase in a residual potential in continuous repeated use.

Now, the polycyclic quinone compounds and azo compounds to be used as a charge generating substance in combination therewith in the present invention will be explained. The polycyclic quinone compounds to be used in the present invention are represented by the following general formula (I);

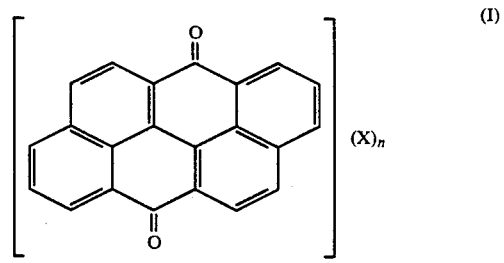

(I)

wherein X is selected from the group consisting of a hydrogen atom, a halogen atom and a cyano group and n is an integer of 0 to 4.

The polycyclic quinone compounds represented by the general formula (I) can be synthesized by a conventional method. For example, the compound

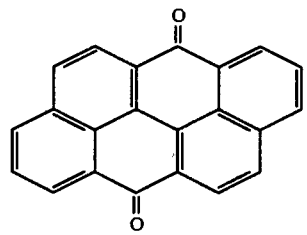

which will be named later as Compound No. I-1, can be synthesized by the following processes. That is, from 1,8-naphtalimide as a starting material 8-amino-1-naphtalic acid is obtained via naphtostyryl in accordance with a conventional method. Then, 8-amino-1-naphtalic acid is dimerized to form bis(8-carboxy-1-naphtyl). The Compound I-1 can be obtained by ring closure of thus obtained bis(8-carboxy-1-naphtyl). Further, the Compound No. I-4

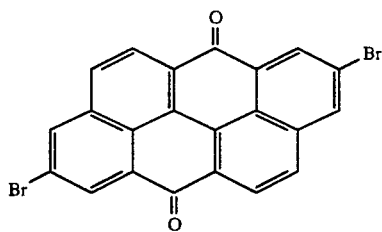

can be obtained by modifying the Compound No. I-1 with Br.

Specific examples of the polycyclic quinone compounds represented by the general formula (I) include the following compounds No. I-1 to I-8.

Compound No I-1

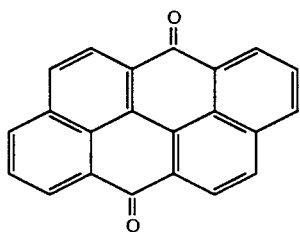

Compound No I-2

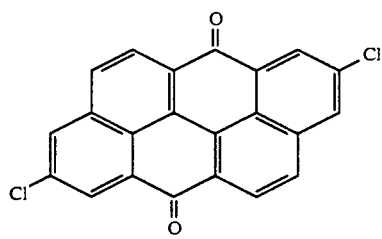

No I-3

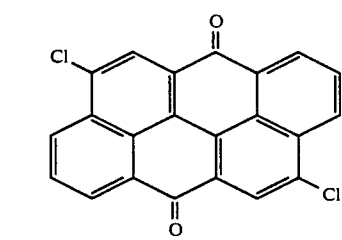

No I-4

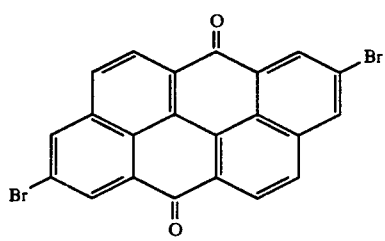

No I-5

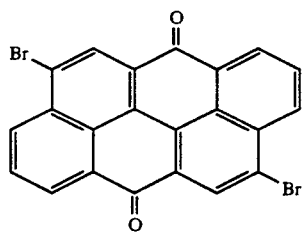

No I-6

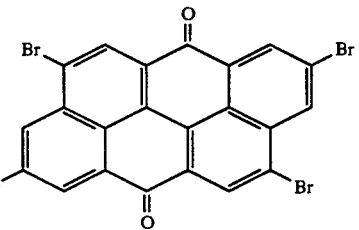

No I-7

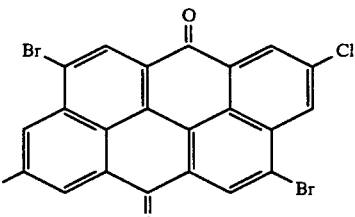

No I-8

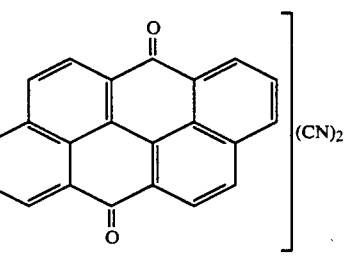

The azo compounds to be used in the present invention in cooperation with the foregoing polycyclic quinone compounds are represented by the following general formula (II);

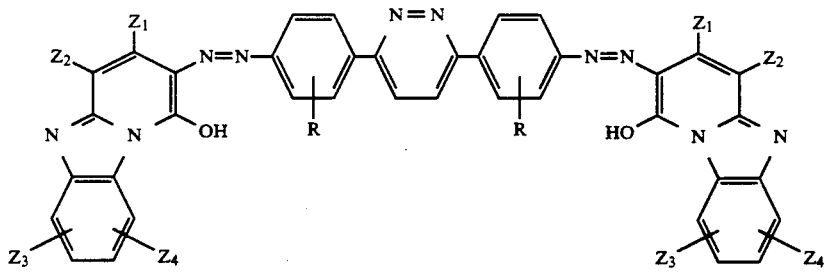

(II)

wherein R is selected from the group consisting of a hydrogen atom, a halogen atom and a substituted or unsubstituted alkyl group and alkoxy group, $Z_1$ is selected from the group consisting of a substituted or unsubstituted alkyl group, aryl group and aromatic heterocyclic group, $Z_2$ is selected from the group consisting of a hydrogen atom, a cyano group, a carbomoyl group, a carboxyl group, an ester group and an acyl group, each of $Z_3$ and $Z_4$ is selected from the group consisting of a hydrogen atom, a halogen atom, a nitro group and a substituted or unsubstituted alkyl group and alkoxy group.

The azo compounds represented by the general formula (II) can be synthesized by a conventional method. For example, the azo compound

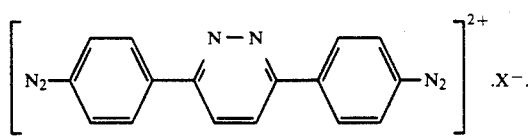

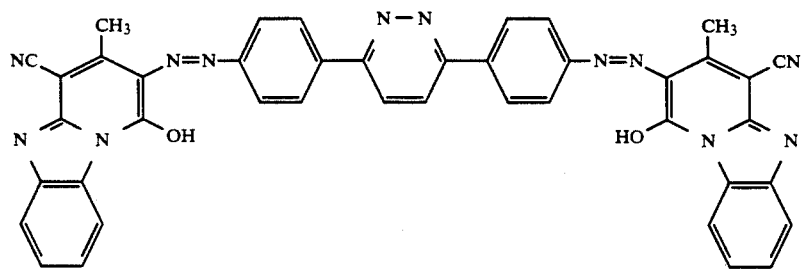

which will be named later as Compound No. II-1, can be obtained by the following processes. That is, 3,6-bis(4-aminophenyl)pyridazine[amine] is diazotized in accordance with a conventional method to form a tetrazonium salt This tetrazonium salt is reacted with a corresponding coupler under the presence of a base to obtain the azo compound (No. II-1).

Specific examples of the azo compounds represented by the general formula (II) include the following compound No. II-1 to No. II-10.

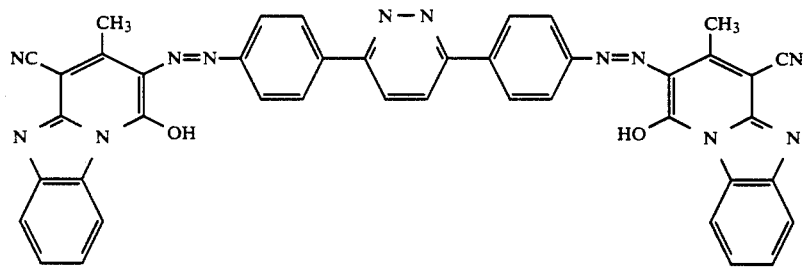

Compound No II-1

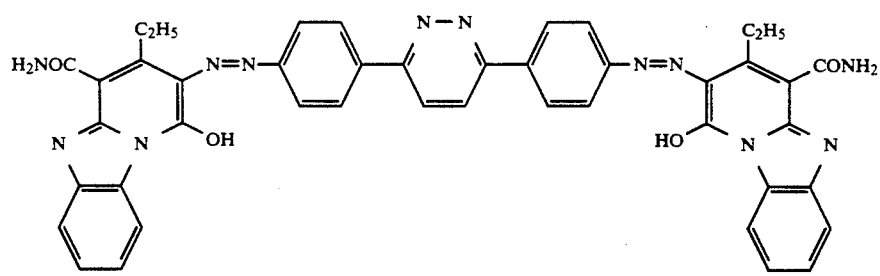

No II-2

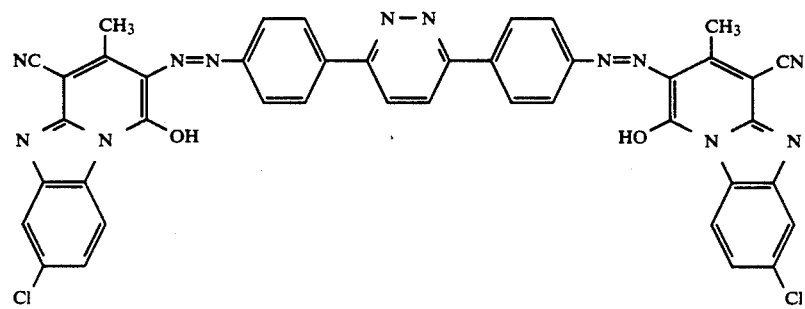

No II-3

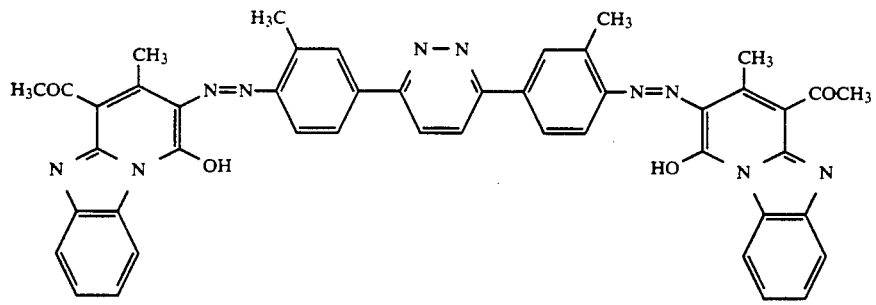
No II-4
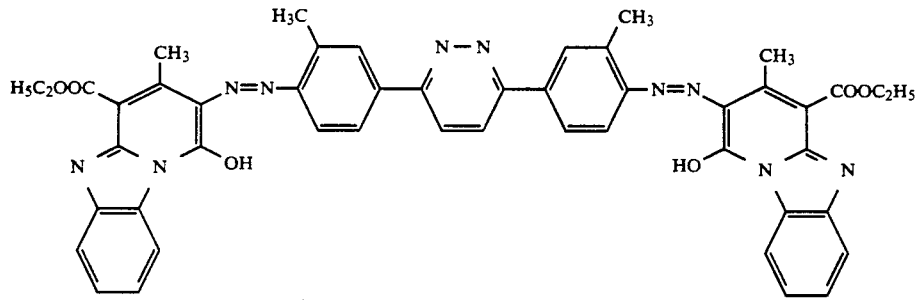
No II-5
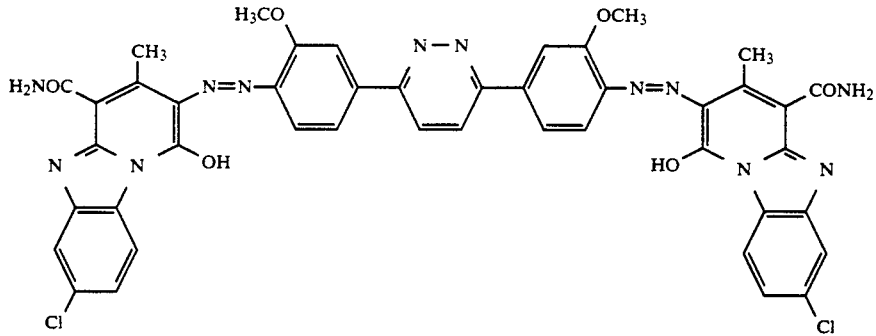
No II-6
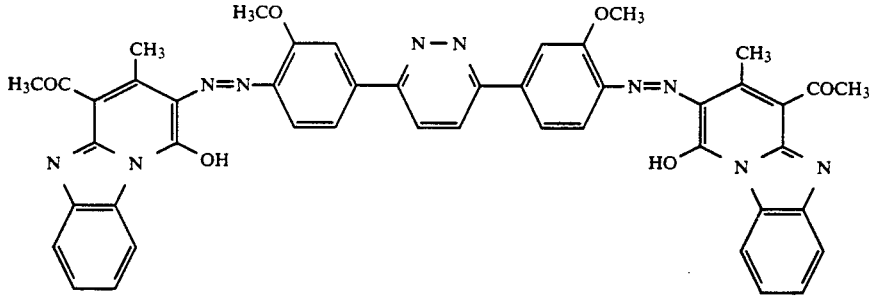
No II-7
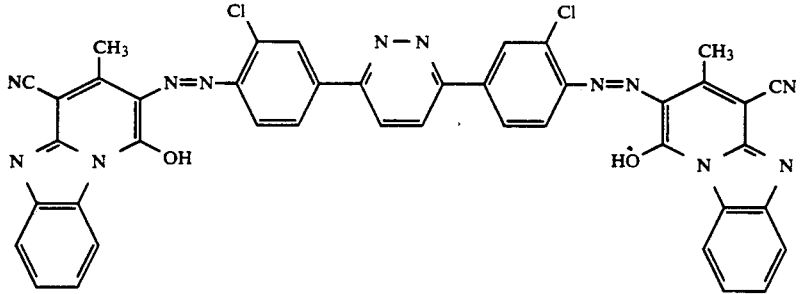
No II-8

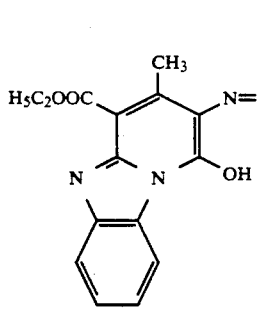
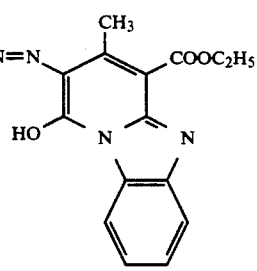

No II-9

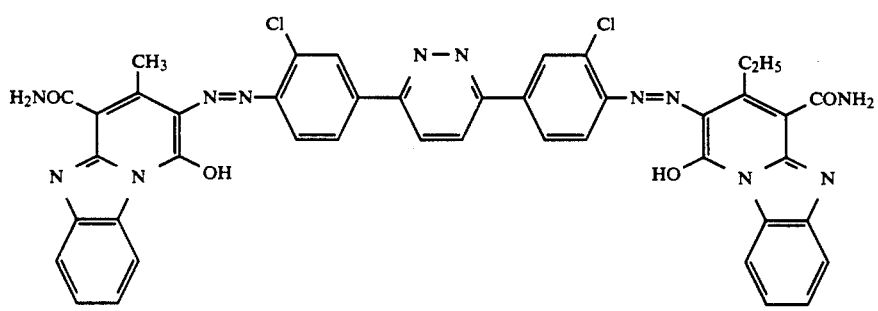

No II-10

Examples will now be given, wherein various polycyclic quinone compounds represented by the general formula (I) and azo compounds represented by the general formula (II) were used to produce photoconductors.

EXAMPLE 1

1 part by weight of p-diethylaminobenzaldehydediphenylhydrazone (ABPH) and 1 part by weight of polycarbonate resin (Panlite L-1250 manufactured by Teijin Chemicals Co., Ltd.) were solved in 6 parts by weight of dichloromethane while agitating to prepare a coating liquid for the charge transporting layer. While 2 parts by weight of the polycyclic quinone compounds No. I-5 and 2 parts by weight of the azo compound No. II-1 were mixed to 700 parts by weight of 2-buthanone together with 3 parts by weight of vinyl chloride-vinylidene chloride copolymer resin (Denka Vinyl 1000W: manufactured by Denki Kagaku Kogyo) as a resin binder. The resultant mixture was kneeded with a mixer for 3 hours to prepare a dispersion coating liquid for the charge generating layer. The coating liquid for the charge transporting layer was applied onto an aluminum deposited polyester film by the wire bar technique to form a charge transporting layer having the dry thickness of 20 μm. Subsequently, the coating liquid for the charge generating layer was applied onto the charge transporting layer to form a charge generating layer having a dry thickness of 1 μm. Further, a covering layer was formed on the charge generating layer. Thus, a photoconductor with a structure corresponding to that shown in FIG. 3 was produced. The covering layer, which is not essential in the present invention, was not provided.

EXAMPLE 2

A photoconductor was produced in substantially the same manner as in Example 1 except that 1 part by weight of the polycyclic quinone compound No. I-5 and 3 parts by weight of azo compound No. II-1 were used as the charge generating substance.

COMPARATIVE EXAMPLE 1

A photoconductor was produced in substantially the same manner as Example 1 except that 4 parts by weight of the polycyclic quinone compound No. I-5 without azo compound were used, as the charge generating substance.

COMPARATIVE EXAMPLE 2

A photoconductor was produced in substantially the same manner as Example 1 except that 4 parts by weight of the azo compound No. II-1 without polycyclic quinone compound were used as the charge generating substance.

COMPARATIVE EXAMPLE 3

A photoconductor was produced in substantially the same manner as Example 3 except that 6 parts by weight of the polycyclic quinone compound No. I-5 without azo compound were used as the charge generating substance.

COMPARATIVE EXAMPLE 4

A photoconductor was produced in substantially the same manner as Example 3 except that 6 parts by weight of the azo compound No. II-1 without polycyclic quinone compound were used as the charge generating substance.

The electrophotographic characteristics of the photoconductors thus produced were measured by utilizing the electrostatic recording paper testing apparatus SP-428. The surface of the respective photoconductors was negatively charged.

The electrophotographic characteristics of the photoconductors thus produced were measured by utilizing an electrostatic recording paper testing apparatus (Kawaguchi Denki Model SP-428). The result obtained are shown in Table 1.

The surface potential $V_s$(volts) of each photoconductor is an initial surface potential which was measured when the surface of the photoconductor was charged in the dark by corona discharge at +6.5 kV for 10 seconds. After the discontinuation of the corona discharge, the photoconductor was allowed to stand in the dark for 2 seconds, after which the surface potential $V_d$ (volts) of the photoconductor was measured. Subsequently, the surface of the photoconductor was irradiated with white light at an illuminance of 2 luxes and the time (seconds) required for the irradiation to decrease the surface potential of the photoconductor to half of the $V_d$ was measured, then from which the half decay exposure amount $E_{\frac{1}{2}}$ (lux·sec) was calculated. Also, the surface potential of the photoconductor after 10 seconds of irradiation thereof with white light at an illuminance of 2 luxes was measured as residual potential $V_r$ (volts). And further, the red reproduction is adopted as a measure of the color reproduction. That is, the ratio of the half decay exposure amount $E_{\frac{1}{2}}$ (550) when the surface of the photoconductor was exposed to a monochromatic light with a wavelength of 550 nm to the half decay exposure amount $E_{\frac{1}{2}}$ (650) when the surface of the photoconductor was exposed to a monochromatic light with a wavelength 650 nm, $E_{\frac{1}{2}}$ (650)/$E_{\frac{1}{2}}$ (550) was measured. The larger the ratio $E_{\frac{1}{2}}$ (650)/$E_{\frac{1}{2}}$ (550), the higher the red reproduction.

TABLE 1

|  | $V_s$ (Volt) | $V_s$ (Volt) | $E_{\frac{1}{2}}$ (lux · sec) | $\frac{E_{\frac{1}{2}} (650)}{E_{\frac{1}{2}} (550)}$ |
| --- | --- | --- | --- | --- |
| Example 1 | 643 | 78 | 1.78 | 23.4 |
| Example 2 | 637 | 87 | 1.67 | 20.3 |
| Comparative Example 1 | 652 | 94 | 2.17 | 28.3 |
| Comparative Example 1 | 634 | 76 | 1.53 | 15.1 |

As can be seen in Table 1, the photoconductors of Examples 1 and 2 show a slightly less red reproduction and a high sensitivity in comparison with the photoconductors of Comparative Example 1, and show a slightly less sensitivity and a superior red reproduction in comparison with the photoconductor of Comparative Example 2. The aforementioned photoconductors were set in the practical copying apparatus having no filter for exposure light and images obtained by using respective photoconductors were evaluated. As a result, the photoconductor of Comparative Example 1 showed good red reproduction but blue reproduction was not good. The photoconductor of Comparative Example 2 showed relatively improved color reproduction in comparison with Comparative Example 2 but the improvement was insufficient. On the contrary, the photoconductors of Examples 1 and 2 showed good blue and red reproduction.

EXAMPLE 3

3 parts by weight of the polycyclic quinone compound No. 1-5, 3 parts by weight of the azo compound No. II-1 and 3 parts by weight of vinyl chloride—vinylidene chloride copolymer resin (Denka Vinyl 1000W) as a resin binder were kneeded with 750 parts by weight of 2-butanone with a mixer for 3 hours to prepare a dispersion coating liquid for the charge generating layer, while, 1 part by weight of p-diethylaminobezaldehyde-diphenylhydrazone (ABPH) and 1 part of polycarbonate resin (Panlite L-1250) as a binder resin were solved in 6 parts by weight of dichloromethane while agitating to prepare a coating liquid for the charge transporting layer. The coating liquid for the charge generating layer was applied onto an aluminum deposited polyester film as an electroconductive substrate to form a charge generating layer with a dry thickness of 1 μm, subsequently, the coating liquid for the charge transporting layer was applied onto the charge generating layer to form a charge transporting layer with a dry thickness of 20 μm. Thus, a photoconductor with a structure corresponding to that shown in FIG. 2 was produced.

EXAMPLE 4

A photoconductor was produced in substantially the same manner as in Example 3 except that 1 part by weight of the polycyclic quinone compound No. I-5 and 5 parts by weight of the azo compound No. II-1 were used as the charge generating substance.

By corona discharge at −6.0 kV, other measuring conditions are the same as in the aforementioned Example 1 through Comparative Example 2. The results obtained are shown in Table 2.

TABLE 2

|  | $V_s$ (Volt) | $V_s$ (Volt) | $E_{\frac{1}{2}}$ (lux · sec) | $\frac{E_{\frac{1}{2}} (650)}{E_{\frac{1}{2}} (550)}$ |
| --- | --- | --- | --- | --- |
| Example 3 | −665 | −86 | 1.58 | 25.1 |
| Example 4 | −657 | −90 | 1.67 | 22.3 |
| Comparative Example 3 | −670 | −103 | 2.53 | 29.2 |
| Comparative Example 4 | −646 | −94 | 1.45 | 16.1 |

As can be seen in Table 2, the photoconductors of Examples 3 and 4 show a slightly less red reproduction and a high sensitivity in comparison with the photoconductor of Comparative Example 3, and show a slightly less sensitivity and a highly improved red reproduction in comparison with the photoconductor of Comparative Example 4. These photoconductors were set in the practical copying apparatus and images obtained by using respective photoconductors were evaluated. As a result, the photoconductors of Examples 3 and 4 showed good characteristics in red reproduction as well as in blue reproduction. On the contrary, the photoconductors of Comparative Examples 3 and 4 showed insufficient red reproduction or insufficient blue reproduction.

EXAMPLE 5

Photoconductors were produced by using polycyclic quinone compounds and azo compounds as shown in Table 3. The processes for producing the photoconductors were substantially the same as in Example 1 except that 2 parts by weight of the respective polycyclic quinone compounds and 4 parts by weight of the respective azo compounds were used as the charge generating substance. The electrophotographic characteristics of thus produced photoconductors were measured in the same manner as that in Example 1. The results obtained are shown in Table 3.

TABLE 3

| charge generating substance polycyclic quinone compound/ azo compound | $E_{\frac{1}{2}}$ (lux · sec) | $\frac{E_{\frac{1}{2}} (650)}{E_{\frac{1}{2}} (550)}$ |
| --- | --- | --- |
| I-1/II-1 | 1.63 | 21.6 |
| I-2/II-2 | 1.84 | 23.7 |
| I-3/II-3 | 1.68 | 20.8 |
| I-4/II-4 | 1.56 | 23.7 |
| I-5/II-5 | 1.61 | 20.5 |

TABLE 3-continued

| charge generating substance polycyclic quinone compound/ azo compound | $E_{\frac{1}{2}}$ (lux · sec) | $\dfrac{E_{\frac{1}{2}}(650)}{E_{\frac{1}{2}}(550)}$ |
|---|---|---|
| I-5/II-6 | 1.71 | 22.6 |
| I-5/II-7 | 1.59 | 23.1 |
| I-5/II-8 | 1.47 | 24.4 |
| I-6/II-9 | 1.64 | 21.8 |
| I-6/II-10 | 1.72 | 19.8 |
| I-7/II-1 | 1.51 | 24.3 |
| I-8/II-2 | 1.69 | 21.4 |
| I-8/II-3 | 1.73 | 23.2 |

As can be seen in Table 3, the photoconductors of Example 5 in which one of the polycyclic quinone compounds I-1 to I-8 was used as a charge generating substance in combination with one of the azo compounds II-1 to II-10, respectively, had a high sensitivity and good characteristics in blue reproduction and red reproduction.

As described above, in accordance with the present invention, since at least one of the polycyclic quinone compounds represented by the aforementioned general formula (I) is used as a charge generating substance in combination with at least one of the azo compounds represented by the aforementioned general formula (II) in a photosensitive layer formed on an electroconductive substrate, a photoconductor shows a high sensitivity, excellent characteristics in repeated use and good blue and red reproduction.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A photoconductor for electrophotography, comprising:
    an electroconductive substrate; and
    a photosensitive layer formed on said electroconductive substrate and including a charge generating substance consisting essentially of at least one polycyclic compound represented by general formula (I) and at least one azo compound represented by general formula (II):

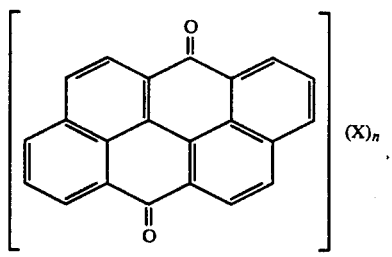

(I)

wherein X is selected from the group consisting of a hydrogen atom, a halogen atom and a cyano group, and n is an integer of 0 to 4;

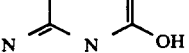

(II)

wherein R is selected from the group consisting of a hydrogen atom, a halogen atom and a substituted or unsubstituted alkyl group and alkoxy group, $Z_1$ is selected from the group consisting of a substituted or unsubstituted alkyl group, aryl group and aromatic heterocyclic group, $Z_2$ is selected from the group consisting of a hydrogen atom, a cyano group, a carbamoyl group, a carboxyl group, an ester group and an acyl group, each of $Z_3$ and $Z_4$ is selected from the group consisting of a hydrogen atom, a halogen atom, a nitro group and a substituted or unsubstituted alkyl group and alkoxy group.

2. The photoconductor as claimed in claim 1, wherein said photosensitive layer comprises a layer including a dispersion of said charge generating substance and a charge transporting substance.

3. The photoconductor as claimed in claim 1, wherein said photosensitive layer comprises a laminate of a charge transporting layer mainly composed of a charge transporting substance and a charge generating layer including said charge generating substance.

4. The photoconductor as claimed in claim 1, wherein the charge generating substance consists of at least one polycyclic compound represented by general formula (I) and at least one azo compound represented by general formula (II).

5. A photoconductor for electrophotography having an improved sensitivity to visible light so as to improve reproduction of blue and red, comprising:
    an electroconductive substrate; and
    a photosensitive layer formed on said electroconductive substrate and including a charge generating substance consisting essentially off at least one polycyclic compound represented by general formula (I) and at least one azo compound represented by general formula (II):

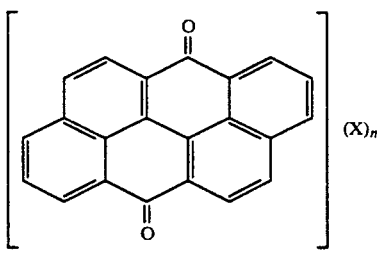

(I)

wherein X is selected from the group consisting of a hydrogen atom, a halogen atom and a cyano group, and n is an integer of 0 to 4;

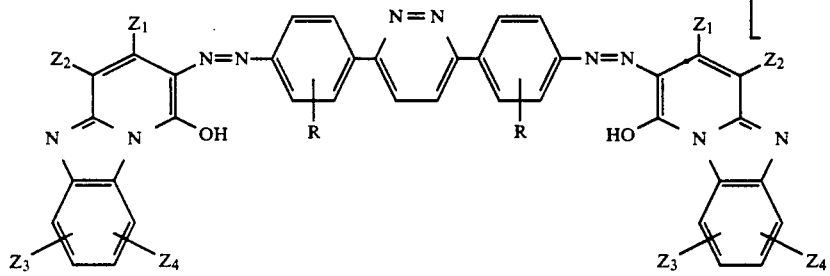

wherein R is selected from the group consisting of a hydrogen atom, a halogen atom and a substituted or unsubstituted alkyl group and alkoxy group, $Z_1$ is selected from the group consisting of a substituted or unsubstituted alkyl group, aryl group and aromatic heterocyclic group, $Z_2$ is selected from the group consisting of a hydrogen atom, a cyano group, a carbamoyl group, a carboxyl group, an ester group and an acyl group, each of $Z_3$ and $Z_4$ is selected from the group consisting of a hydrogen atom, a halogen atom, a nitro group and a substituted or unsubstituted alkyl group and alkoxy group, whereby the photoconductor has an improved sensitivity to visible light so as to improve reproduction of blue and red.

6. The photoconductor as claimed in claim 5, wherein the charge generating substance consists of at least one polycyclic compound represented by general formula (I) and at least one azo compound represented by general formula (II).

7. The process of improving the sensitivity to visible light of a photoconductor for electrophotography so as to improve reproduction of blue and red, the process comprising:

providing a photoconductor comprised of an electroconductive substrate and a photosensitive layer formed on the electroconductive substrate, the photosensitive layer comprising a charge generating substance consisting essentially of at least one polycyclic compound represented by general formula (I) and at least one azo compound represented by general formula (II):

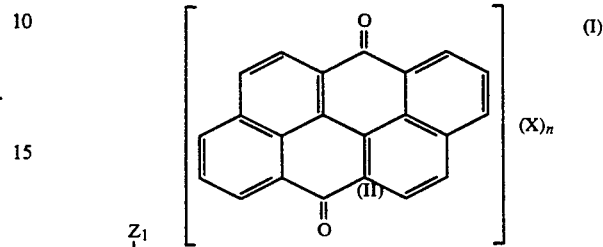

(I)

wherein X is selected from the group consisting of a hydrogen atom, a halogen atom and a cyano group, and n is an integer of 0 to 4;

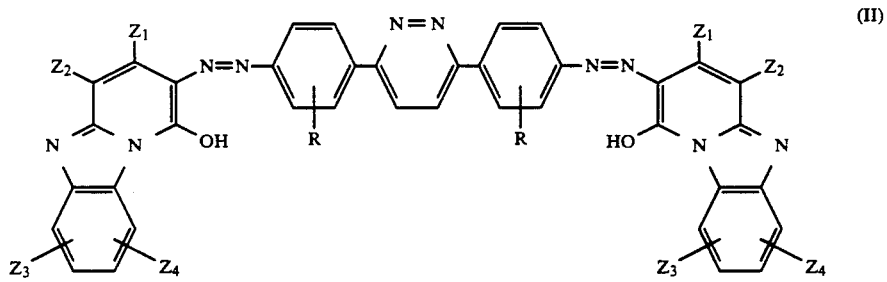

(II)

wherein R is selected from the group consisting of a hydrogen atom, a halogen atom and a substituted or unsubstituted alkyl group and alkoxy group, $Z_1$ is selected from the group consisting of a substituted or unsubstituted alkyl group, aryl group and aromatic heterocyclic group, $Z_2$ is selected from the group consisting of a hydrogen atom, a cyano group, a carbamoyl group, a carboxyl group, an ester group and an acyl group, each of $Z_3$ and $Z_4$ is selected from the group consisting of a hydrogen atom, a halogen atom, a nitro group and a substituted or unsubstituted alkyl group and alkoxy group.

8. The process according to claim 7, wherein the charge generating substance consists of at least one polycyclic compound represented by general formula (I) and at least one azo compound represented by general formula (II).

* * * * *